3,219,578
PROCESS OF COAGULATING AND PRODUCING
SETTLING OF FINELY DIVIDED SOLIDS
George A. Cruickshank, La Grange, and Carl E. Johnson, Westchester, Ill., assignors to Nalco Chemical Company, a corporation of Delaware
No Drawing. Filed Aug. 2, 1957, Ser. No. 675,831
6 Claims. (Cl. 210—52)

This invention relates to a method of coagulating and producing settling of finely divided solids, especially those which are predominantly inorganic and normally remain suspended in water, more particularly dilute suspensions in water containing concentrations of predominantly inorganic solids within the range of about 0.0015% (15 parts per million) to about 25% by weight of said suspensions.

Among the most difficult industrial problems is the clarification of industrial wastes which would otherwise create a nuisance and cause pollution of lands and streams. Examples of such wastes are phosphate mine waters, coal washing water, clay suspensions, calcium carbonate suspensions, and other suspensions of finely divided solids in water which result from industrial processes such as mining, washing, purification, and the like. These suspensions normally contain the solid materials in very finely divided form in concentrations within the range of about .0015% to about 3% by weight of the suspension and sometimes in amounts up to about 25% by weight of the suspension. Such suspensions will remain stable for days, months, and sometimes even years and many of them are not affected by the addition of ordinary coagulants such as alum. If the solids are allowed to remain in suspension the resultant suspensions cannot be utilized for industrial processes and also present a disposal problem.

In addition to industrial waste waters it is often necessary to treat waters obtained from natural sources to render them suitable for many applications. Rivers, streams and lakes often contain suspended solids such as silt, clays and minor amounts of organic color bodies which are undesirable and are often difficult to remove by using inorganic coagulating chemicals. Municipalities generally employ large amounts of inorganic coagulants such as alum, sodium aluminate and lime. In some instances, excessive amounts as well as long periods of settling time are required before clarification is achieved.

Naturally occurring waters from many sources, and in some instances brines and brackish waters, are used in the recovery of petroleum by secondary water-flooding operations. These systems are dependent on waters free from objectionable suspended impurities since such impurities tend to plug the underground formations into which said waters are placed.

Also, naturally occurring waters used in such industrial operations as papermaking, petroleum refining, hydroelectric plants, atomic energy operations, metal plating, boiler plants, and the like, must often be free of suspended matter.

When using the coagulants now known to the art there is often the problem of the supernatant liquid containing amounts of finely divided suspended impurities which are harmful in some instances. These impurities are often residues from inorganic coagulants used to treat the system. It would be desirable if a chemical treatment were afforded whereby such conditions were no longer prevalent.

One of the special problems with which the present invention is concerned is the improvement of floc size and settling in hot phosphate softening processes. In such processes waters containing hardness components, such as calcium and magnesium, are treated with phosphates to form insoluble calcium and magnesium phosphate salts which settle out and are separated. Orthophosphates, such as anhydrous disodium phosphate, are employed for this purpose. In ths type of process, the precipitated inorganic solids are very finely divided with the result that coagulation and settling are relatively slow and it is difficult to produce a water free from turbidity. Various coagulation aids have heretofore been employed in an effort to improve floc size and settling but many of the materials which function satisfactorily as coagulants in clarifying other types of turbid waters leave much to be desired, and in many cases are ineffective for practical purposes, when employed as coagulation aids in hot posphate softening processes.

The expression "phosphate softening" as used herein refers to a process in which a water soluble phosphate which forms insoluble calcium and magnesium salts is added to water containing calcium and/or magnesium salts in order to reduce the concentration of calcium and/or magnesium in the water by precipitation as an insoluble phosphate. Hot phosphate softening is frequently used as a primary softening in low hardness waters. It is often used as a secondary softening following lime soda softening of high hardness waters. The term "lime soda softening" includes those processes in which lime is employed either alone or in conjunction with minor amounts of soda ash or alkaline materials such as sodium aluminate for the treatment of water to separate the hardness components by precipitation. In the hot softening processes temperatures of 180° F. to 275° F. (under pressure) are frequently employed, the preferred temperatures being within the range of 212° F. to 240° F. Some types of chemicals which are useful in coagulation for other purposes tend to undergo chemical changes and are practically ineffective as coagulation aids in hot phosphate softening processes.

One of the objects of the present invention is to provide a new and improved method for coagulating and producing settling of finely divided, predominantly inorganic solids from relatively dilute suspensions in water.

Another object of the invention is to provide a new and improved process for coagulating and producing settling of finely divided solids which are predominantly inorganic and normally remain suspended in water in concentrations of 0.0015% to 25% by weight of the suspension.

A further object of the invention is to provide a process of treating suspensions of the type described in which relatively small amounts of added substances will produce a uniform floc and settling of the finely divided solids without introducing into the liquid substances which have a harmful effect on industrial processes or cause harmful pollution of streams.

Yet another object is to provide a treatment which will produce a clear supernatant liquid free of residual finely divided suspended impurities.

An additional object of the invention is to provide a process to increase floc size and settling rate in softening processes, especially in hot phosphate softening.

A further object is to provide a process for the clarification of low turbidity waters. Other objects will appear hereinafter.

In accordance with the invention, it has been found that it is possible to produce coagulation and settling of finely divided solids which are predominantly inorganic and normally remain suspended in water in concentrations of 0.001% to 25% by weight of the suspension by treating said suspensions with small amounts based on the weight of the total suspension of a polymer having a molecular weight of at least about 1,000 and derived by the condensation of alkyl dihalides, viz, alkyl dichlorides or alkyl dibromides, and polyalkylene polyamines having at least three amino groups.

These condensation polymers are derived, for example, by the condensation of dichlorides or dibromides of lower alkanes having 2–4 carbons—such as 1,2-dichloroethane, 1,2 - dibromoethane, 1,3 - dichloropropane, 1,3 - dibromopropane, and other haloalkanes, preferably having one halogen on each terminal carbon—with polyalkylene polyamines, preferably N-unsubstituted polyalkylene polyamines having at least three amino groups, e.g., diethylene triamine, dipropylene triamine, triethylene tetramine, tripropylene tetramine, tetraethylene pentamine, tetrapropylene pentamine, and higher homologs thereof such as mixtures of polyalkylene polyamines having 6–10 amino groups. The condensation may be carried out in water or a water soluble or water-miscible vehicle such as ethylene glycol.

In order to produce successful coagulant polymers, the molar ration of alkyl dihalide to polyalkylene polyamine should be at least 1:1 and should not exceed 1.5:1. Optimum resuts are obtained with polymers in which the aforesaid molar ratio is between about 1.1:1 and 1.3:1. The latter ratios produce polymers having a small amount of cross-linking, but the crosslinking is not sufficient to cause the formation of polymer gels or resinous polymers.

The hydrophilic condensation polymers employed for the purpose of the invention are of a relatively high molecular weight which is believed to be in excess of 1000 and in most cases greater than 2000, but because of the difficulty of determining molecular weight, the most satisfactory way of ascertaining the proper amount of condensation and polymerization to obtain optimum results in coagulation is by viscosity measurement. The products which have been found to be especially suitable for the practice of the invention have a minimum viscosity in an aqueous alkaline pH solution containing 20% by weight of the condensation polymer at a temperature of 75° F. of about 7 centipoises. The upper limit of the voscosity is anything short of gel formation and may be, for example, up to 150 to 200 centipoises. However, the preferred range of viscosity is about 14 to 90 centipoises. The viscosity determinations were made by using a 20% polymer solution having a pH of about 12.6.

The polymers of the instant invention are particularly effective in producing coagulation and settling of certain types of suspensions of finely divided inorganic solids where it is employed in conjunction with another coagulant, for example, sodium aluminate, clays such as bentonite, aluminum sulfate (alum), iron sulfate, sodium polyacrylate (or other anionic water soluble polymeric coagulant), acid, lime or a combination of any two or more of these coagulants.

A particularly useful embodiment of the invention is the employment of the hydrophilic alkylene polyamine polyfunctional halohydrin polymer in combination with high molecular weight water-soluble anionic polymers. These high molecular weight water-soluble anionic polymers have a molecular weight of at least 10,000 and have a structure derived by the polymerization of at least one mono-olefinic compound through the aliphatic unsaturated group, said structure being substantially free of cross-linking. They contain a plurality of anionic functional groups such as carboxyl and sulfonic acid groups. They may contain other groupings, where such polymers are copolymers, but they should be substantially anionic in character. Examples of a few such polymers are polyacrylic acid, polymethacrylic acid, and polystyrene sulfonic acid. In addition to the polyanionic polymers, polypolar polymers and mixed polyanionicopolypolar copolymers may also be employed. Such polymers are, for example, polyacrylamide, partially hydrolyzed polyacrylamide, polyvinylpyrrolidone and polyvinylalcohol. All of these high molecular weight anionic and/or polypolar polymers are described in U.S. Patent 2,625,529, the disclosure of which is herein incorporated by reference. The expression "polypolar polymers" refers to polymers having a plurality of non-ionized groups whereby said polymers are rendered hydrophilic.

The alkylene polyamines which are reacted with the polyfunctional halohydrins for the purpose of the invention are well known compounds having the general formula $$H_2N(C_nH_{2n}NH)_xH$$

where $n$ is an integer and $x$ is two or more. Examples of such alkylene polyamines are the polyalkylene polyamines, such as diethylenetriamine, triethylenetetramine, tetraethylenepentamine, dipropylenetriamine, and the similar polypropylene polyamines and polybutylene polyamines.

The polymers of the instant invention may be produced by slowly adding one of the reactants to a mixture of the other reactant and the liquid vehicle. Reproducible results are best obtained by adding slowly the polyalkylene polyamine to a mixture of the alkyl dihalide and the vehicle, e.g., water or ethylene glycol. The reaction may proceed, with refluxing, at temperatures between about 130° F. and 375° F. without appreciable variation in the coagulating properties of the polymers produced. The alkyl dihalides are preferably those having a halogen group on the terminal carbons, e.g., 1,2-dichloroethane, 1,3-dichloropropane, etc.

When a polyalkylene polyamine-alkyl dihalide condensation polymer of the instant invention is used alone for coagulating suspensions of finely divided solids, a typical dosage range is around 10 to 20 parts, and rarely exceeding 150 parts, of a 20% solution of the polymer per million parts of the suspension. When it is used in conjunction with bentonite, alum, iron sulfate or sodium aluminate the dosage of the 20% solution usually found most effective is within the range of 1 to 5 p.p.m. A particularly effective combination is bentonite of the type shown in Ryznar, U.S. Patent 2,420,340, and Lindsay et al. U.S. Patent 2,284,827, and a polymer of the type herein described. Excellent results have been obtained using the combinations under extremely difficult coagulation conditions.

The dosage will vary depending upon the particular type of system to be treated. For example, if 8 p.p.m. is the optimum dosage in some instances poor results will be obtained with 16 p.p.m. or 2 p.p.m. High dosages may be particularly ineffective and may have a dispersing rather than a coagulation effect. The final effective dosage may be found to be as low as 0.10 p.p.m. Thus, it is essential to make preliminary tests in order to determine the optimum dosage.

The following examples in which the quantities are given in parts by weight unless otherwise indicated illustrate preferred compositions coming within the scope of the invention and their use for the purpose of the invention.

EXAMPLE I

To a mixture of 0.1 gm.-mol of tetraethylenepentamine and 30 grams of ethylene glycol, there was added 0.1 gm.-mol of 1,3-dibromopropane in increments of one ml. while maintaining the temperature below 190° F. The reactants were stirred thoroughly during the addition to avoid formation of a residual, oily material. When the reaction mixture became clear and homogeneous, water was added to bring the total weight to 194.5 grams—a 20% concentration of active polymer.

EXAMPLE II

A mixture of 0.1 gm.-mol of tetraethylenepentamine, 0.1 gm.-mol of 1,2-dibromoethane, and 30 grams of ethylene glycol was heated with stirring to 150° F., at which point an exothermic reaction began. The reaction temperature was kept below 210° F., and water in sufficient quantity to give a 20% solution of the polymer was added after the reaction mixture became clear and homogeneous.

EXAMPLE III

A mixture of 0.1 gm.-mol of tetraethylene pentamine, 0.15 gm.-mol of 1,2-dichloroethane, and 30 gms. of ethylene glycol were heated with stirring to 230° F., at which point an exothermic reaction began. The reaction temperature was kept below 290° F., and water in sufficient quantity to give a 20% solution of the polymer was added after the reaction mixture became clear and homogeneous.

EXAMPLE IV

A mixture of 0.1 gm.-mol of tetraethylene pentamine, 0.15 gm.-mol of 1,3-dichloropropane, and 30 gms. of ethylene glycol was heated with stirring to 194° F., at which point the reaction became exothermic. The temperature rise stopped at 210° F., and the temperature dropped to 196° F. It was reheated to 210° F. and again became exothermic. The temperature rise was stopped at 220° F.—the temperature dropping to 200° F. Upon reheating to 220° F., no further exothermic temperature rise was noted. Upon cooling, water was added in sufficient quantity to give a 20% solution.

EXAMPLE V

A mixture of 0.1 gm.-mol of diethylene triamine, 0.15 gm.-mol of 1,2-dichloroethane and 30 gms. of ethylene glycol were heated with stirring. At 210° F., the reaction became exothermic. The exothermic reaction was stopped at 230° F. by cooling. The mixture was reheated to 230° F., but the reaction did not become exothermic again. Water in sufficient quantity to give a 20% solution of the polymer was added after the reaction mixture became clear and homogeneous.

EXAMPLE VI

A mixture of 0.1 gm.-mol of diethylene triamine, 0.1 gm.-mol of 1,3-dibromopropane, and 30 gms. of ethylene glycol were heated with stirring to 135° F., at which point the reaction became exothermic. Cooling by indirect heat exchange was applied in an attempt to hold the reaction temperature at 190° F., but the vigorous reaction proceeded at higher temperatures—not exceeding 300° F. When the reaction subsided, there were two layers of liquid. At 160° F., the heterogeneous mixture was stirred vigorously for about one minute. A homogeneous, clear, amber product resulted, to which was added water in an amount sufficient to provide a 20% solution of the polymer.

EXAMPLE VII

A mixture of 0.1 gm.-mol of triethylene tetramine, 0.15 gm.-mol of 1,2-dichloroethane, and 30 gms. of ethylene glycol were heated with stirring to 212° F., at which point the reaction became exothermic. The temperature was allowed to rise to 230° F., where the exothermic reaction was stopped by cooling by indirect heat exchange with cold water. When the mixture was reheated to 230° F., it did not again become exothermic. Water was added in an amount sufficient to provide a 20% solution of the polymer.

EXAMPLE VIII

A mixture of 0.1 gm.-mol of triethylene tetramine and 0.1 gm.-mol of 1,3-dibromopropane was reacted in 30 gms. of ethylene glycol in the manner outlined in Example VI and diluted with water to provide a 20% solution.

EXAMPLE IX

In a distilling flask equipped with a reflux condenser and stirring rod, 0.3 gm.-mol of tetrathylene pentamine was mixed with 45 gms. of ethylene glycol, and the mixture was heated to a predetermined temperature. A total of 0.3 gm.-mol of 1,2-dichloroethane was added to the mixture as rapidly as possible without excessive refluxing. The temperature was carefully controlled to maintain the mixture at or near the original temperature. A series of products, tabulated below, were prepared according to the foregoing procedure at the following temperatures.

| | Temperature, ° F. | Remarks |
|---|---|---|
| A | 235 | Reaction time—45 min. |
| B | 250 | Do. |
| C | 270 | Do. |
| D | 290 | Do. |
| E | 310 | Do. |
| F | 330 | Do. |
| G | 350 | Reaction time—1 hr. Drops "spit" when hit hot mixture. |
| H | 370 | Reaction time—90 min. Pronounced "spitting." |

As the reaction temperatures of the foregoing products increased, the colors of the final products become progressively lighter—going from deep amber to deep straw.

EXAMPLE X

In a three-necked distilling flask equipped with a reflux condenser and stirring rod, 0.9 gm.-mol of tetraethylene pentamine and 70 gms. of softened water were mixed and heated to 239° F. A total of 0.9 gm.-mol of 1,2-dichloroethane was added drop-wise over a period of two hours while maintaining the reaction temperature between 239° F. and 242° F. The resulting product was diluted with water to 20% concentration.

A preferred procedure from the viewpoint of obtaining reproducible results is illustrated in the following example wherein the polyalkylene polyamine is added to a mixture of alkyl dihalide and water.

EXAMPLE XI

A group of polymers were prepared in a 500 ml., three-necked flask equipped with a stirrer and a reflux condenser. To a mixture of ethylene dichloride and water was added, with stirring, tetraethylene pentamine over a period of about five minutes. Heating of the reactants was begun after the temperature reached about 130° F., and the reflux began at about 160° F. Refluxing was continued over a measured period of time. The product was cooled to room temperature, and the viscosity was measured with a Brookfield viscometer at 77° F. The procedures employed in preparing various polymers by the foregoing general method and properties of the resultant polymers are summarized in the following table.

*Table I*

| No. | $Cl(CH_2)_2Cl$, gm.-mol | TEPA, gm.-mol | $H_2O$ ml. | Highest Temp., ° F. | Rxn. Time, Min. | Viscosity, cps. at 77° F. |
|---|---|---|---|---|---|---|
| A | 0.54 | 0.45 | 72 | 230 | 750 | 752 |
| B | 0.54 | 0.45 | 72 | 181 | 390 | 582 |
| C | 0.64 | 0.45 | 72 | 198 | 1,215 | 1,760 |
| D | 0.64 | 0.45 | 72 | 226 | 1,365 | 4,050 |
| E | 0.59 | 0.45 | 72 | 189 | 570 | 798 |
| F | 0.59 | 0.45 | 72 | 176 | 570 | 735 |
| G | 0.59 | 0.45 | 72 | 176 | 570 | 700 |
| H | 0.405 | 0.31 | 24.7 | 181 | 180 | 450 |
| J | 0.405 | 0.31 | 14 | 185 | 130 | 470 |
| K | 0.405 | 0.31 | 14 | 244 | 150 | 950 |

EXAMPLE XII

The resulting polymer E in the above table was formulated into an aqueous solution suitable for use as a coagulant by dilutant the polymer to 20% concentration based on the total weight of the formulation, with softened Chicago tap water and adding 10.5% tank car caustic and 5.0% sodium nitrite, based on the total weight of the formulation. The resulting solution is a noncorrosive, 20% active formulation of the condensation polymer of ethylene dichloride and tetraethylene-pentamine at a 1.2:1 molar ratio, respectively, and constitutes one of the preferred embodiments of the invention. The formulation has a freezing point of 16–18° F., a boiling point of 210° F., a viscosity of 10 cps. @ 77° F. (measured on an Ostwald viscometer), and was stable with respect to coagulation ability when stored at 10° F., 35° F., room temperature, and 120° F. for four days, at the end of which the temperature was restored to room temperature.

EXAMPLE XIII

In a liter, three-necked flask equipped with stirrer, condenser, and thermometer, 1.66 gm.-mols of ethylene dichloride was mixed with 216 gm. of deionized water. Over a five-minute period, 1.35 gm. mol of "high boiling" tetraethylenepentamine was added. The temperature rose to 125° F. The mixture was then heated and refluxed between 158° F. and 176° F. for 17 hours. The viscosity of the resultant product on an Ostwald viscosimeter at room temperature was 2,500 cps. "High boiling" tetraethylenepentamine is a higher boiling fraction of tetraethylenepentamine.

The foregoing polymer was formulated into an aqueous solution as follows:

| | Percent |
|---|---|
| Polymer | 20 |
| NaOH (50% solution) | 10.5 |
| $NaNO_2$ | 5.0 |
| Deionized water | 64.5 |
| | 100.0 |

The formulation had a pH of 10.2 and a viscosity, measured on an Ostwald viscosimeter at 82° F., of 23.5 cps. Its stability was not impaired after five days storage at 120° F., 80° F., or 32° F.

COAGULATION

In order to evaluate the quality of the polymers of this invention as coagulants, the following test was used. The coagulation results reported are determined by visually comparing the floc size, settling rate, and supernatant clarity (sparkle) with those produced by a standard, i.e., a coagulant which has been established as producing satisfactory results.

To a 50–50 mixture of Chicago tap water and deionized water is added 100 p.p.m. kaolin. The hardness is standardized at 30 p.p.m., expressed as $CaCO_3$. The standardized water is added to 400 ml. beakers in 350 ml. amounts, the measured quantity of test coagulant is added, and the water is stirred at 100 r.p.m. for 5 minutes and 20 r.p.m. for 10 minutes and thereafter allowed to stand quiescently for a 15-minute settling period. The results reported are observed during and after the test. The turbidity of the supernatant, expressed as p.p.m. $SiO_2$ is determined on a Hillige turbidometer.

In the following tables, the results of coagulation evaluations run according to the foregoing procedure are reported. In each case, the coagulant consisted of 30 p.p.m. of saponitic clay of the type described in the Ryznar U.S. Patent No. 2,420,340 and the identified polymer in the concentration stated, expressed as p.p.m. of the active polymer. In each instance, the sparkle was a reading of 5, and the turbidity, expressed as p.p.m. $SiO_2$, was 1.

Table II

| No. | Polymer | Conc. | Floc Size | Settling Rate | Fines |
|---|---|---|---|---|---|
| 1 | Example VI (DET+DBP) | 0.4 | F | 3 | 2 |
| 2 | do | 0.6 | FM | 4– | 2 |
| 3 | do | 0.8 | M | 5– | 2 |
| 4 | do | 1.0 | M | 5– | 2 |
| 5 | Example VII (TET+DCE) | 0.4 | F | 3– | 2 |
| 6 | do | 0.6 | M | 4– | 3 |
| 7 | do | 0.8 | M | 5– | 4 |
| 8 | do | 1.0 | M+ | 5 | 5– |
| 9 | Example VIII (TET+DBP) | 0.4 | FM | 4 | 4 |
| 10 | do | 0.6 | M | 5– | 5– |
| 11 | do | 0.8 | M+ | 5 | 5– |
| 12 | do | 1.0 | ML | 5+ | 5– |
| 13 | Example IX (TEP+DCE) (A) | 0.2 | M | 4+ | 5 |
| 14 | do | 0.4 | ML | 5– | 5 |
| 15 | do | 0.6 | ML | 5– | 5 |
| 16 | do | 0.8 | ML+ | 5+ | 5 |
| 17 | Example IX (TEP+DCE) (B) | 0.6 | ML | 4+ | 5 |
| 18 | Example IX (TEP+DCE) (C) | 0.6 | ML– | 5– | 5 |
| 19 | Example IX (TEP+DCE) (D) | 0.6 | ML | 5 | 5 |
| 20 | Example IX (TEP+DCE) (E) | 0.6 | ML | 5 | 5 |
| 21 | Example IX (TEP+DCE) (F) | 0.6 | ML | 5 | 5 |
| 22 | Example IX (TEP+DCE) (G) | 0.6 | ML | 5 | 5 |
| 23 | Example IX (TEP+DCE) (H) | 0.6 | ML | 5– | 5 |
| 24 | Example X | 0.2 | M+ | 4+ | 5 |
| 25 | do | 0.4 | ML | 5– | 5 |
| 26 | do | 0.6 | ML+ | 5+ | 5 |
| 27 | do | 0.8 | ML+ | 5+ | 5 |

Table III

| No. | pH | Coagulant | Conc., p.p.m. | Floc Size | Settling Rate |
|---|---|---|---|---|---|
| 1 | 3.0 | A | 0.4 | ML– | 4+ |
| 2 | 3.0 | A | 0.5 | ML | 5– |
| 3 | 3.0 | A | 0.6 | ML+ | 5 |
| 4 | 3.0 | B | 0.4 | ML– | 4+ |
| 5 | 3.0 | B | 0.5 | ML | 5– |
| 6 | 3.0 | B | 0.6 | ML+ | 5– |
| 7 | 4.2 | A | 0.2 | F | 3+ |
| 8 | 4.2 | A | 0.4 | ML– | 4+ |
| 9 | 4.2 | A | 0.6 | ML+ | 5– |
| 10 | 4.2 | A | 0.8 | ML+ | 5 |
| 11 | 4.2 | A | 1.0 | L | 5+ |
| 12 | 4.2 | B | 0.2 | F | 3 |
| 13 | 4.2 | B | 0.4 | ML– | 5– |
| 14 | 4.2 | B | 0.6 | ML+ | 5– |
| 15 | 4.2 | B | 0.8 | ML+ | 5 |
| 16 | 4.2 | B | 1.0 | L | 5+ |
| 17 | 8.0 | A | 0.2 | F+ | 3 |
| 18 | 8.0 | A | 0.4 | ML– | 5– |
| 19 | 8.0 | A | 0.5 | ML | 5– |
| 20 | 8.0 | A | 0.6 | ML+ | 5 |
| 21 | 8.0 | B | 0.2 | FM | 3 |
| 22 | 8.0 | B | 0.4 | ML– | 5– |
| 23 | 8.0 | B | 0.5 | ML | 5– |
| 24 | 8.0 | B | 0.6 | ML+ | 5 |

Coagulant A in Table III was the product formulated according to Example XII. Coagulant B was a similar 20% formulation in water of an ethylene dichloride-tetraethylene pentamine condensation polymer (molar ratio 1.2:1) prepared by adding the dichloride to a mixture of water and the polyamine.

In the tables, the floc symbols are as follows:

F—fine
FM—fine medium
M—medium
ML—medium large
L—large

The sparkle and settling rate numerals may range from

1–5, the higher numbers indicating the better characteristics.

Other coagulation tests are summarized in the following table.

*Table IV*

COAGULATION OF NATURAL WATERS (SABINE RIVER WATER)

| Coagulant Concentration, p.p.m. | | Floc Size | Settling Rate | Sparkle | Turbidity, p.p.m. as $SiO_2$ |
|---|---|---|---|---|---|
| Ex. XII | Ex. XIII | | | | |
| 50 | -------- | ML | 4 | 1 | 33 |
| 55 | -------- | ML | 4 | 4+ | 11 |
| 60 | -------- | VL | 5– | 5– | 11 |
| -------- | 35 | VL | 5 | 3 | 15 |
| -------- | 40 | VL | 5– | 5 | 1 |
| -------- | 45 | VL | 5 | 5 | 0 |
| -------- | 50 | VL | 5 | 5 | 0 |

VL—Very large.

The Sabine River water was collected during a rainy season and was particularly difficult to clarify.

Settling tests were also run with heavy slurries to determine the effectiveness of the coagulants in accelerating the settling of solids in heavy slurries. In these tests, 250 ml. samples of the slurry were placed 250 ml. mixing cylinders. These were inverted 12 times in 30 seconds. Blank values were obtained by determining the percentage volume of the supernatant at 5 and 10-minute intervals. If blank values fell within 2% range, the coagulant was added, the sample inverted as before, and the percent volume of supernatant again determined at the end of the given time interval. Results with copper concentrate slurries and uranium tailings are reported in the following table.

*Table V*

| Slurry Type | Coagulant | | Time, Min. | Settling Rate, Percent Supernatant |
|---|---|---|---|---|
| | Type | Conc., p.p.m. | | |
| Copper concentrate | Blank | -------- | 10 | 33 |
| | Ex. XII | 50 | 10 | 60 |
| | Ex. XIII | 42 | 10 | 47 |
| Uranium tailings | Blank | -------- | 20 | 10.5 |
| | Ex. XIII | 25 | 20 | 13.5 |

The following dosages produced satisfactory settling of the solids in coagulation tests to those first described: 20% aqueous solution of tetraethylenepentamine and ethylene dichloride condensation polymer (Example XI-A), 0.4 p.p.m.; 60% aqueous solution of tetraethylenepentamine and 1,4-dichlorobutane condensation polmer, 0.6 p.p.m.; 20% aqueous solution of tetraethylenepentamine and 1,3-dibromopropane condensation polymer (Example I), 1.0 p.p.m.; 20% aqueous solution of tetraethylenepentamine and 1,2-dibromoethane condensation polymer (Example II), 1.0 p.p.m.; 20% aqueous solution of tetraethylene pentamine and 1,2-dichloroethane condensation polymer (Example III), 0.6 p.p.m.; 54.5% ethylene glycol solution of tetraethylenepentamine and 1,3-dichloropropane condensation polymer (Example IV), 0.5 p.p.m.; 50% ethylene glycol solution of diethylenetriamine and 1,3-dibromopropane condensation polymer (Example VI), 1.5 p.p.m.; 49.6% ethylene glycol solution of triethylenetetramine and 1,2-dichloroethane (Example VII), about 1.0 p.p.m.; 53.5% ethylene glycol solution of triethylenetetramine and 1,3-dibromopropane condensation polymer (Example VIII), 1.0 p.p.m.; and 20% aqueous solution of tetraethylenepentamine and 1,2-dichloroethane condensation polymer (Example X), 0.5 p.p.m.

Thus, the invention is especially useful in coagulating and producing settling of finely divided solids which are predominantly inorganic and are present in concentrations of 15 parts per million to 30,000 parts per million by weight of the total suspension (0.0015% to 3%) in water.

The use of the invention makes it possible to cause settling of many different types of solids from aqueous suspension thereof, at a higher rate than has heretofore been possible in many instances. The invention is especially valuable in clarifying turbid waters and in removing from suspensions suspended solids which would otherwise be objectionable and would interfere with the disposal of various types of waste waters and wash waters from industrial processes. The invention is also very valuable in coagulating and producing settling of finely divided solids in phosphate mine waters, coal washing waters, clay suspensions, calcium carbonate suspensions, suspensions obtained in softening processes, especially hot phosphate softening processes, and other suspensions of finely divided solids in water which result from industrial processes, such as mining, washing and purification.

One of the particularly novel and useful advantages of this invention is the effectiveness of the coagulants at concentrations much lower than those required with conventional materials. The addition of relatively minute amounts of the polymers herein described causes the suspended solids to settle so that the water in which they are suspended can be separated by decantation, filtering, or any other suitable manner. In many instances, the solids are merely allowed to settle in a pond or pool and the supernatant liquid is allowed to overflow into a stream, channel, or other passageway. Thus, the coagulated solids are separated and do not contaminate rivers, lakes, or other bodies of water. The materials employed to bring about the coagulation and settling are used in such small amounts as to have no significant contaminating effect.

The expression "separating the resultant coagulated solids from suspension in said water" is employed therein to include and cover separation by settling as well as separation by actually removing the coagulated solids from the water, as by filtering, and separation by removing the water from the coagulated solids, as by decanting or allowing the supernatant water to overflow.

In the practice of the invention it is usually desirable where the polymer solution is being used as a coagulant aid to add it after the other coagulants have been added. This is particularly true when high molecular weight water soluble anionic or polypolar polymers are used. In general, the time of addition should be at the point where the growing micelles produced by the previously added coagulants can just be resolved by the human eye. Where only pH adjustment of the water is employed in conjunction with the addition of the polymer solution it appears that the latter may be added before or after the chemical used for pH adjustment. In a continuous clarification plant it may be desirable to add the polymer solution half way through the flash mixer or at a point several feet downstream of the main injection of other chemicals. This is especially true of lime and soda ash treatment.

The invention is especially valuable in the coagulation of turbid river and surface waters for general industrial and cooling use. Alum and iron sulfate which are presently used for coagulating such waters have the serious handicap of permitting objectionable iron and alumina floc carryover. Cooling system makeup water especially should be free of such floc carryover. The present invention makes it possible to reduce the quantity of or eliminate the use of these materials. The invention is also useful in municipal water clarification.

The invention is hereby claimed as follows:

1. A process of coagulation of finely-divided, predominantly inorganic solids suspended in water which comprises mixing with said water in which is suspended said finely-divided, predominantly inorganic solids susceptible to coagulation, a quantity sufficient to produce coagulation of a hydrophilic condensation polymer of a polyalkylene polyamine and a 2–4 carbon alkyl dihalide having the halogen groups on the terminal carbons, said polymer being produced by refluxing a mixture of a slight molar excess of said dihalide with said polyalkylene polyamine to a thickened subresinous condition short of gel formation.

2. A process of coagulation of finely-divided, predominantly inorganic solids suspended in water which comprises mixing with said water in which is suspended said finely-divided, predominantly inorganic solids susceptible to coagulation, a quantity sufficient to produce coagulation of a hydrophilic condensation polymer of a polyalkylene polyamine and a 2–4 carbon alkyl dihalide having the halogen groups on the terminal carbons, said polymers being produced by refluxing a mixture of 1.1–1.3 mols of said dihalide per mol of said polyalkylene polyamine to a thickened subresinous condition short of gel formation.

3. A process as in claim 1 in which said hydrophilic polymer is employed as a coagulant in conjunction with another coagulant.

4. A process as in claim 3 in which said other coagulant is bentonite.

5. A process as claimed in claim 3 in which said other coagulant is a high molecular weight polymer from the class consisting of anionic and polypolar polymers.

6. A process of clarifying turbid surface waters which are essentially dilute aqueous suspensions of finely-divided, predominantly inorganic solids which comprises adding to such waters about 0.1–30 parts by weight of a hydrophilic condensation polymer of a polyethylene polyamine and a 2–4 carbon alkyl dihalide having the halogen groups on the terminal carbons, said polymer resulting from the condensation-polymerization of a polyethylene polyamine having 3–5 amino groups and said alkyl dihalide in a molar ratio of alkyl dihalide to polyethylene polyamine within the range of from 1.1:1 to 1.3:1 to a thickened subresinous condition short of gel formation, and separating the resultant coagulated solids from the main body of water.

References Cited by the Examiner

UNITED STATES PATENTS

| | | | |
|---|---|---|---|
| 2,483,513 | 10/1949 | Allen et al. | 260—583 |
| 2,616,874 | 11/1952 | Yost et al. | 260—70 |
| 2,769,841 | 11/1956 | Dylewski | 260—583 |
| 2,834,675 | 5/1958 | Jen et al. | 260—2 X |
| 2,885,357 | 5/1959 | Archibald et al. | 210—54 |

FOREIGN PATENTS 154,799  1/1954  Australia.

OTHER REFERENCES

Hagan: "Chemical Engineering," page 148, June 1956.
A.E.C. (Atomic Energy Commission) publication, NYO 7403, 28 pp., Oct. 30, 1956.

MORRIS O. WOLK, *Primary Examiner.*

CARL F. KRAFFT, *Examiner.*